United States Patent [19]
Griffiths

[11] Patent Number: 5,151,121
[45] Date of Patent: Sep. 29, 1992

[54] SILICATE BINDERS

[75] Inventor: Thomas Griffiths, Warrington, England

[73] Assignee: Unilever Patent Holdings B.V., Rotterdam, Netherlands

[21] Appl. No.: 460,875

[22] PCT Filed: May 11, 1989

[86] PCT No.: PCT/GB89/00509
§ 371 Date: Mar. 13, 1990
§ 102(e) Date: Mar. 13, 1990

[87] PCT Pub. No.: WO89/10819
PCT Pub. Date: Nov. 16, 1989

[30] Foreign Application Priority Data
May 13, 1988 [GB] United Kingdom ............ 8811411

[51] Int. Cl.$^5$ ............ C04B 28/26; B23K 35/22
[52] U.S. Cl. ............ 106/600; 106/38.3; 219/145.23
[58] Field of Search ............ 106/600, 38.3; 219/146.1, 146.21, 146.22, 146.23, 145.23

[56] References Cited

U.S. PATENT DOCUMENTS

| | | | |
|---|---|---|---|
| 2,333,811 | 11/1941 | Neumann | 219/145.23 |
| 3,180,747 | 4/1965 | Patton et al. | 106/600 |
| 3,392,039 | 7/1968 | Cuneo | 106/623 |
| 3,455,709 | 7/1969 | Sears | 106/623 |
| 3,533,816 | 10/1970 | Oken | 106/600 |
| 3,576,597 | 4/1971 | Freyhold | 252/313.2 |
| 4,103,067 | 7/1978 | Jackson | 219/145.23 |
| 4,172,110 | 10/1979 | Caesar et al. | 106/600 |
| 4,251,711 | 2/1981 | Tanigaki et al. | 219/145.23 |
| 4,367,394 | 1/1983 | Sakai et al. | 219/145.23 |
| 4,940,882 | 7/1990 | Bates | 219/145.23 |

Primary Examiner—Mark L. Bell
Assistant Examiner—Deborah Jones
Attorney, Agent, or Firm—Cushman, Darby & Cushman

[57] ABSTRACT

Lithium silicate solution having a $SiO_2:Li_2O$ weight ratio from 7.5:1 to 9:1 is usable as the sole silicate binder. This silicate binder is of particular value in preparing welding rods having reduced chromium emission the fumes.

3 Claims, No Drawings

SILICATE BINDERS

FIELD OF THE INVENTION

This invention relates to lithium silicate binder solutions which are of value in the manufacture, as examples, of welding rods and sand moulds.

BACKGROUND OF THE INVENTION

Silicates are well characterised in the literature, for example 'The Chemistry of Silica' by R. K. Iler (published by Wiley Interscience 1979), and they have a number of applications as binders Examples of these applications are in sand moulding for metal casting, protective coatings, sealants, adhesives and as welding rod binders.

In the latter application the silicate binder is required to provide mechanical strength to the formulation around the metal core and have a satisfactory moisture resistance.

Additionally, the effect of binder composition on the evolution of chromium fumes during welding has been described by Kimura et al in a paper presented to the American Welding Society in April 1979 and published in Welding Research Supplement July 1979 The chromium fumes can arise from both the substrate and rod and Kimura demonstrated that reducing the sodium and potassium level in the water soluble binder component leads to a reduction in evolution of chromium fumes while the presence of lithium did not lead to chromium evolution. Thus there is an advantage in using only lithium silicate as the rod binder.

A general background description of welding can be found in Kirk Othner (pub Wiley & Son 1970) vol 22 pages 241 to 252. Although the term welding 'rod' is used herein it will be understood that the welding electrode used may have a shape other than the geometric rod.

GENERAL DESCRIPTION OF THE INVENTION

The invention provides a lithium silicate capable of acting as the sole silicate binder in welding rod compositions, sand moulds and the like and having a $SiO_2$:$Li_2O$ weight ratio from about 7.5 to about 9:1. This silicate also provides sand moulds for casting having a particularly good strength. This lithium silicate is preferably obtained as solutions with the properties:

| | |
|---|---|
| Specific gravity @ 20° C. | 1.19 to 1.21 |
| Lithium oxide | 2.4 to 2.6% w/w |
| Silica | 20.1 to 21.0% w/w |
| Weight ratio $SiO_2$:$Li_2O$ | 7.5 to 9:1 |
| Solids content | 22% to 26% wt |

Preferably the solids content is from about 18%, preferably from about 22%, to about 26% by weight Above 26% the solution becomes too viscous to use and below 18% the solution does not act as an efficient binder.

The invention extends to a method of preparing lithium silicate as defined wherein silica hydrogel is mixed with lithium hydroxide solution, preferably under conditions of shear, at a temperature not above about 35° C. The lump silica hydrogel used in the process is obtained from an acid/silicate reaction, for example as disclosed in GB 1215928 (Unilever), and may contain from about 5% to about 80% by weight silica, more usually about 20% to about 50%

The applicants have found lithium silicate of the defined weight ratio provides welding rods of desired strength and water resistance without the requirement to have another soluble silicate present which would give rise to chromium fumes. The use of the lithium silicate of the invention as the sole silicate binder also reduces the total fume evolved during welding.

LITERATURE

The use of a mixture of lithium, potassium and sodium silicates as a welding rod binder solution is described in GB 1532847 (van Bearle) Preparation of a silicates mixture by dissolving silica hydrogel in silicate solution and then admixing lithium hydroxide is provided in U.S. Pat. No. 3,522,066 (Lithium Corp). The applications for lithium silicates have been generally described in Electrical Manufacture September 1964. GB 1183120 (Henkel) describes preparation of lithium silicates by mixing silicic acid and lithium hydroxide solution at a temperature above 80° C. GB 1581182 (Kobe Steel) is directed to the problem of chromium fumes in welding but teaches the use of specified oxides in colloidal form in the binder.

SPECIFIC DESCRIPTION OF THE INVENTION

Examples of the preparation of the lithium silicate of the invention and its application in welding and sand moulding will now be given to illustrate but not limit the invention.

EXAMPLE 1

This silicate solution is prepared by dissolving lithium hydroxide monohydrate in demineralised water (1163 mls at 20° C.) with constant stirring for 15 minutes using a high speed agitator (Moritz obtained from Moritz Chemical Engineering Kingston upon Thames, England). Acid washed silica hydrogel lumps (33% solids) was then added in two stages with stirring Half was added over 15 minutes and the solution allowed to stand for 10 minutes before adding the remainder of the hydrogel over 20 minutes. Stirring was continued for up to 3 hours before the final product was available for use.

Four batches of the silicate solution were prepared with the amounts of reactants and properties given in Table I together with a comparative lithium silicate solution (V) of higher ratio.

TABLE I

| BATCH | I | II | III | IV | V |
|---|---|---|---|---|---|
| $LiOH.H_2O$ (g) | 240 | 255 | 260 | 290 | 119 |
| Silica Hydrogel (g) | 2173 | 2375 | 2140 | 2460 | 1450 |
| Total solids | 22.42 | 23.46 | 22.84 | 23.73 | 19.05 |
| $Li_2O$ (% wt) | 2.37 | 2.39 | 2.60 | 2.65 | 1.55 |
| $SiO_2$ (% wt) | 20.05 | 21.07 | 20.24 | 21.08 | 17.50 |
| Weight ratio | 8.46 | 8.82 | 7.79 | 7.96 | 11.30 |
| S. Gravity | 1.1932 | 1.2003 | 1.1989 | 1.2074 | 1.15 |

EXAMPLE 2

Lithium silicate solution from these four batches was used as binder in the preparation of welding rods standard compositions and methods described by J. Griffiths in Industrial Minerals March 1985.

These rods had good structural strength and bonding, satisfactory water resistance and used lithium silicate as the sole water soluble silicate binder.

The electrodes tested were Babcock 'S' 316L Regular (electrode A) (obtainable from Babcock Welding Products Ltd of England) and an equivalent electrode using lithium silicate solution of the invention as the sole silicate binder (electrode B). A comparison electrode (D) was prepared using the lithium silicate V and tested together with a standard electrode (C) (Babcock standard S1). These electrodes were stainless steel manual metal are electrodes have a diameter of 3.25 mm. All tests were p performed on horizontal-vertical fillets which were 250 mm long and made from 50 mm × 10 nm Type 316 stainless steel.

Welding was carried out at approximately 120 amps DC positive (Table 1). Each test consisted of welding a horizontal-vertical fillet using an arc length determined by the welder as being 'normal' for the electrode under investigation. Voltage, current and arcing time were measured electronically using The Welding Institute system (Welding Institute Research Bulletin vol 25 No. 1 (January 1984) p14).

Fume samples for emission rate tests were collected on glass fibre filters (Type GF/C 240 mm diameter), which were weighed before and after welding to determine the weight of fume collected The weight of deposited weld metal was also determined. A Swedish fume box was used for the tests, this fume box is described in Welding Institute Research Bulletin vo. 25 No. 7 July 1984 p230 and International Institute of Welding doc 11E-233-77.

From the above it was possible to calculate fume emission rate using the units:
milligrams fume per second
milligrams fume per gram deposited weld metal.

Sufficient fume for analysis was collected on Whatman 41 paper filters by repeated welding. (Paper filter, in preference to glass filters, were used because of their low blank value)

The principle analytical technique for the collected fumes was X-ray fluorescence spectrometry. In this case 1 g sample was fused with a mixture of 2 g lanthanum oxide and 9 g lithium tetraborate at 1200° C. for 12 minutes. The resulting fusion mixture was cast into a bead of suitable size for analysis.

Hexavalent chromium was analysed using a spectrophotometric method employing s-diphenyl carbazide as a colour reagent.

Table II shows the fume emission rate results, together with relevant welding parameters and an indication of the number of tests performed. Thus use of lithium silicate as the sole silicate binder reduces the Cr Vl emission but use of a lithium silicate according to the present invention also reduces the total fume emission.

A typical welding rod formulation, intended for forming round a cylindrical stainless steel rod, contains (parts by weight):

| | |
|---|---|
| Ferrochrome alloy powder | 13.5 |
| rutile | 36 |
| feldspa | 13.5 |
| calcium carbonate | 22.5 |
| sodium carboxymethyl cellulose | 4.5 |
| lithium silicate of invention | 10.0 |
| | 100.0 |

Incorpiration of the lithium silicate of the invention may require some variation in the coating process, e.g. baking, but these variations can be identified by experimentation.

TABLE II

| | WELDING PARAMETERS AND FUME EMISSION RATES | | | | | | |
|---|---|---|---|---|---|---|---|
| | | Welding Parameters | | | | Fume Emission Rates | |
| Electrode | No Tests | Polarity | OCV | Current A | Volts V | Mean mg/s | Mean mg/g deposit | Cr Vl |
| A | 5 | DC+ | 80 | 118 | 23 | 3.5 | 11.7 | 4.9 |
| B | 5 | DC+ | 80 | 117 | 24 | 1.6 | 4.7 | 0.5 |
| C | 5 | DC+ | 80 | 134 | 26 | 4.6 | 12.6 | 5.3 |
| D | 6 | DC+ | 80 | 132 | 30 | 4.4 | 12.2 | 0.1 |

EXAMPLE 3

The utility of the lithium silicate of the invention for sand moulding was demonstrated by adding 150 g of one of the batches to sand (1 Kg) and mixing thoroughly for 1 minute.

A portion was then placed in a mould, compressed three times and the green strength measured. A number of cores were made and heated at various temperatures, from 58° C. to 350° C., for 1 hour. The cores were allowed to cool overnight and the strength then measured. The results given in Table III demonstrate the lithium silicate binder provides satisfactory core strengths.

TABLE III

| Temp (°C.) | Green | 58 | 100 | 125 | 150 | 200 | 250 | 300 | 350 |
|---|---|---|---|---|---|---|---|---|---|
| Core Strength (lbs per sq in) | 1 | 160 | 260 | 930 | 320 | 210 | 170 | 140 | 150 |

I claim:

1. In a method of preparing welding rods or sand moulds wherein the components of the rods or moulds are mixed in the presence of an effective amount of a binder, the improvement wherein a lithium silicate solution having a $SiO_2:Li_2O$ weight ratio from about 7.5:1 to about 9:1 and a solids content of from about 18% to about 26% by weight, is used as the sole silicate binder.

2. A method according to claim 1 wherein the solids content of said solution is from about 22% to about 26%.

3. The method of claim 1 wherein the solution is one having a specific gravity at 20° C. of 1.19 to 1.21 and a solids content of about 18–26% by weight, said solution consisting essentially of 2.4–2.6% w/w lithium oxide and 20.1 to 21.0% w/w silica in a $SiO_2:Li_2O$ weight ratio from about 7.5:1 to about 9:1.

* * * * *